June 25, 1963
F. J. FUCHS, JR
3,094,898
TEMPLATE FIXTURE
Filed June 23, 1959
4 Sheets-Sheet 1
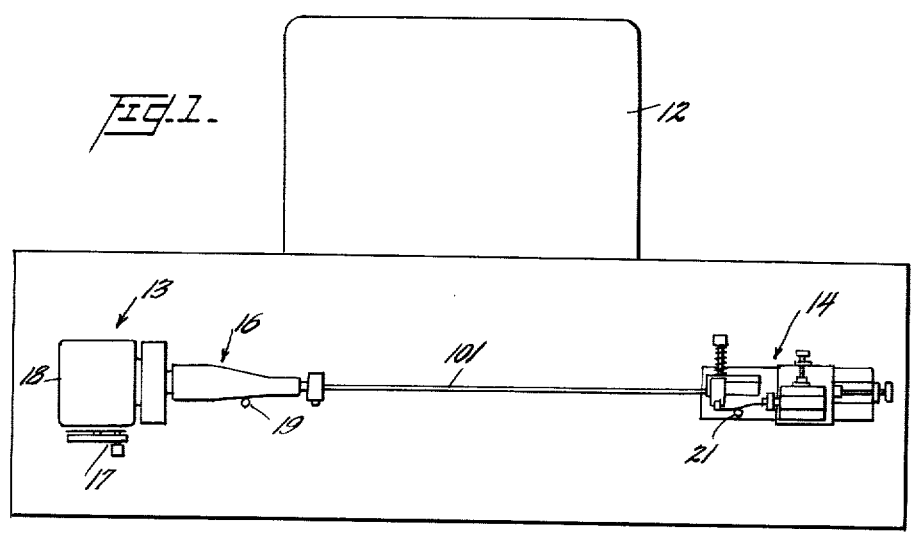
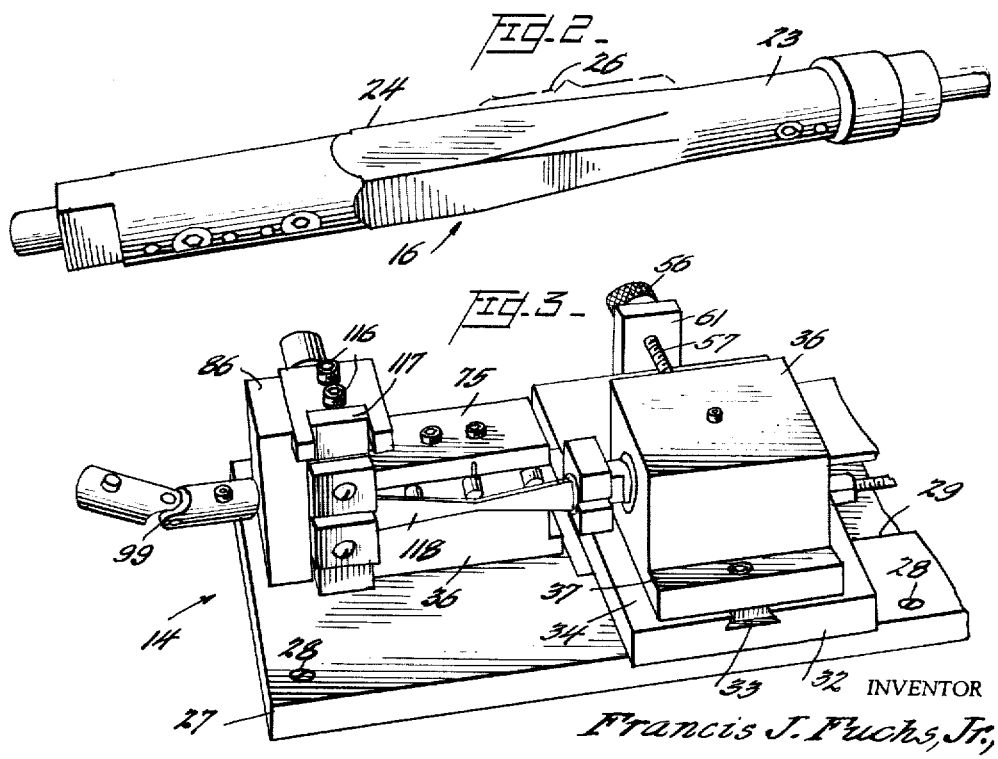
INVENTOR
Francis J. Fuchs, Jr.,
BY C. B. Hamilton
ATTORNEY

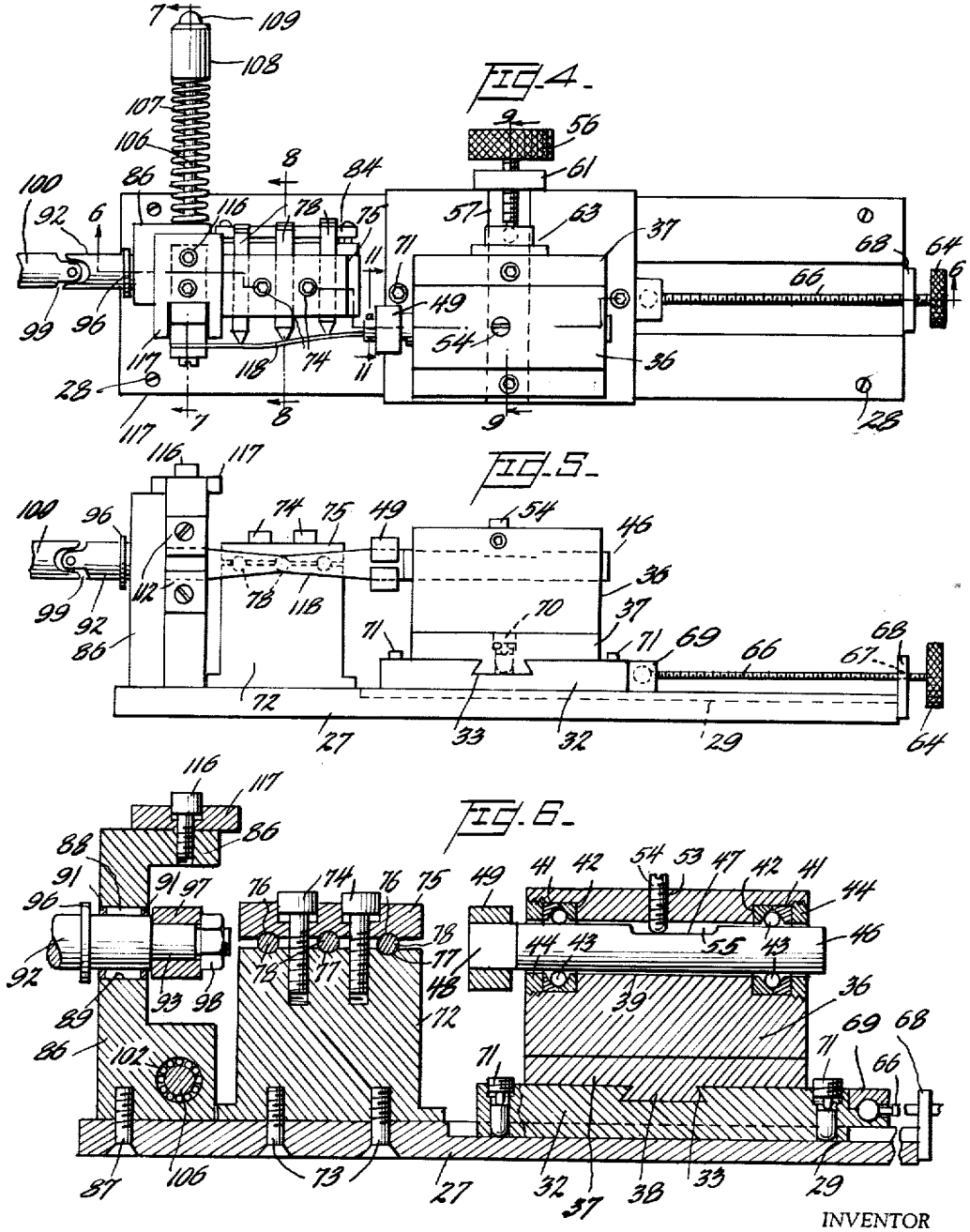

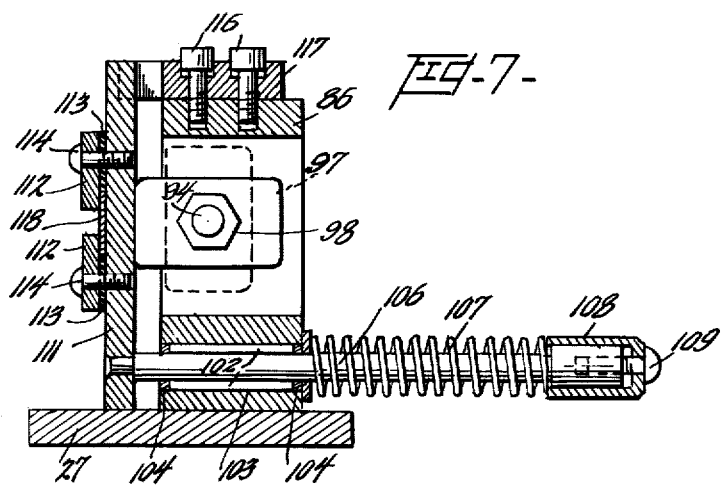
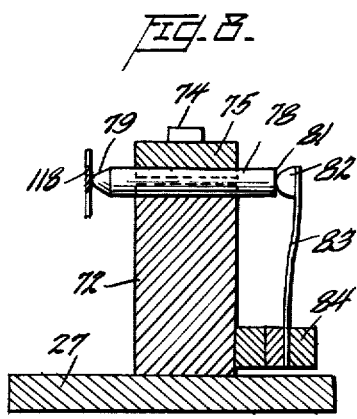
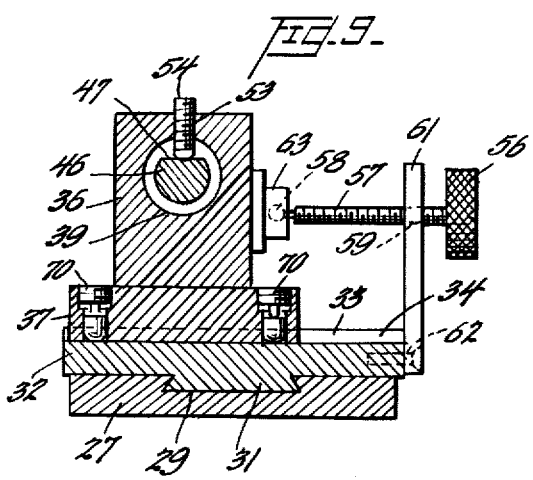
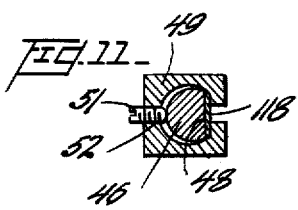

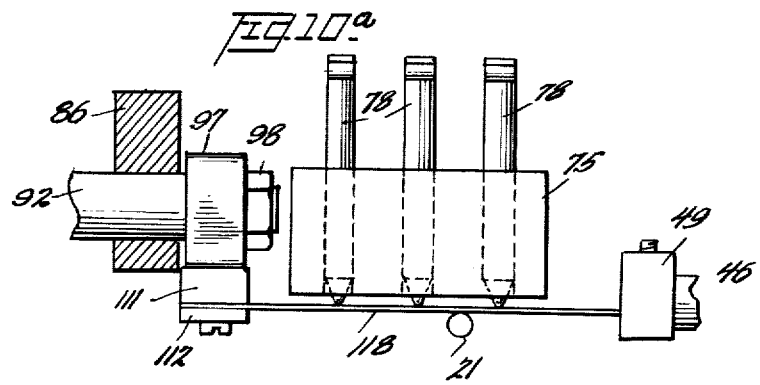
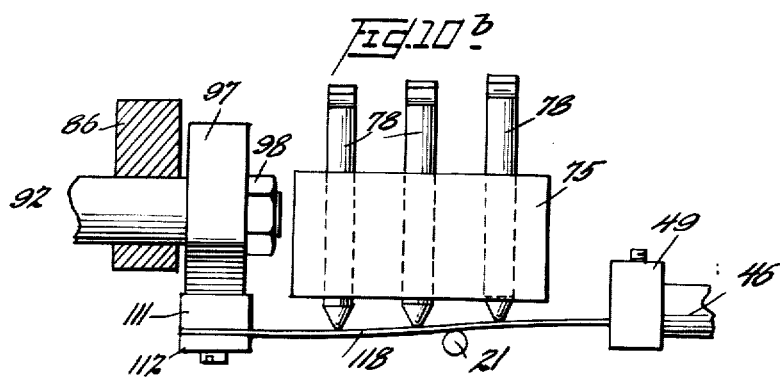
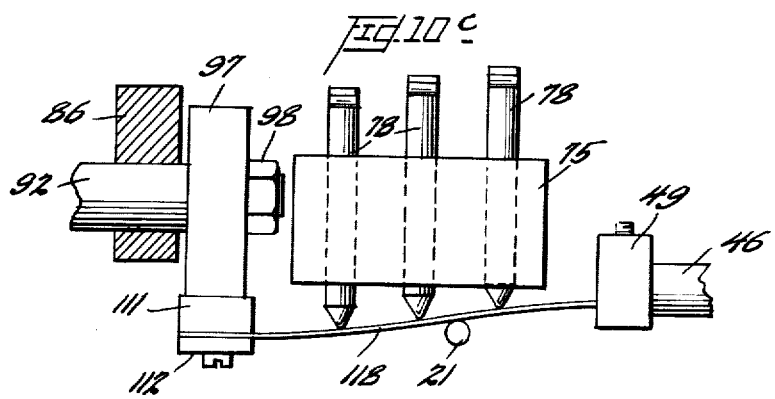

3,094,898
TEMPLATE FIXTURE
Francis J. Fuchs, Jr., Winston-Salem, N.C., assignor to Western Electric Company, Incorporated, New York, N.Y., a corporation of New York
Filed June 23, 1959, Ser. No. 822,287
8 Claims. (Cl. 90—13)

This invention relates to apparatus for generating curves and more particularly to apparatus for generating smooth transition curves between polygonal and round sections of a workpiece.

In milling operations it is often necessary to create a transition between polygonal and round sections of a workpiece. To achieve this result it has been necessary in the past to calculate station-to-station cross sections within a transition zone prior to the actual milling operation. Such a procedure has proved both slow and expensive, especially in close tolerance work.

It is therefore an object of this invention to provide new and improved apparatus for generating curves.

Another object of this invention is to provide new and improved apparatus for producing a smooth transition between polygonal and round sections of a workpiece.

Apparatus illustrating certain features of this invention may include a flexible template engaged by a plurality of clamping means. Actuating means shift the clamping means relatively in predetermined increments for flexing the template to generate a series of curves of predetermined shape.

More specifically, apparatus illustrating certain features of the invention may include a flexible template which is engaged by movable clamps at each end. A rotatable cam shifts the clamps relatively, bending the template to produce a smooth curve. A tracing stylus is then moved over the curved template and a workpiece within a work holder is shaped by a cutting head to the form of the curve.

A complete understanding may be had from a fully detailed description of a specific embodiment thereof when read in conjunction with the appended drawings, in which:

FIG. 1 is a plan view of apparatus embodying the invention mounted on a common support with a milling machine;

FIG. 2 is a perspective view of a workpiece formed by the milling machine shown in FIG. 1;

FIG. 3 is a perspective view of a curve-generating apparatus;

FIG. 4 is a plan view of the apparatus shown in FIG. 3;

FIG. 5 is an elevational view of the apparatus shown in FIG. 3;

FIG. 6 is a cross-sectional view of the curve-generating apparatus taken along line 6—6 of FIG. 4;

FIG. 7 is a cross-sectional view of the curve-generating apparatus taken along line 7—7 of FIG. 4;

FIG. 8 is a cross-sectional view taken along line 8—8 of FIG. 4;

FIG. 9 is a cross-sectional view taken along line 9—9 of FIG. 4;

FIGS. 10a, 10b, and 10c are enlarged plan views of an identical portion of the curve-generating apparatus shown in FIG. 4, showing incremental positions of flexible template; and FIG. 11 is an enlarged cross-sectional view taken along line 11—11 of FIG. 4.

There is shown in FIG. 1 a support 12 on which is mounted a workholder 13 and a curve-generating apparatus 14. The workholder 13 rotates a workpiece 16 about an axis incrementally as indexed by a vernier 17 through suitable gearing within a housing 18. Shaping means such as a milling head 19 forms the workpiece 16 to a design followed by a stylus 21 on the curve-generating apparatus 14. The stylus is suitably connected to the milling head 19 in any conventional manner. The finished workpiece 16, shown in detail in FIG. 2, consists of a portion 23 of round cross section, a portion 24 of rectangular cross section, and a transitional portion 26 therebetween. Although a portion 24 of rectangular cross section is shown, the curve-generating apparatus is capable of producing a smooth transition from a portion of round cross section to a portion of a cross section chosen from a variety of shapes.

As shown in FIG. 3, the curve-generating apparatus 14 is mounted upon a base 27 which is secured to the support 12 by threaded members 28. Extending longitudinally and medially from one end of the base 27 is a dovetail groove 29 in which a tongue 31, FIG. 9, is slidably mounted. A plate 32 having a dovetail groove 33 on its upper surface 34 is formed integrally with the tongue 31, the groove 33 being normal to the dovetail groove 29 and of a length to extend across the upper surface 34 of the plate 32. A block 36 (FIG. 6) is secured to a plate 37 which has a depending tongue 38 slidable within the dovetail groove 33.

An aperture 39 extends through the block 36 and includes countersinks 41 which form shoulders 42 within each end of the aperture. A pair of ball bearings 43 are retained within the countersinks 41 by lock rings 44 and slidably support a rod 46 having an intermediate horizontal flat 47 and a terminal vertical flat 48. A C-clamp 49 (FIG. 11) is supported by the rod 46 and is removably attached thereto by a setscrew 51 threaded in an aperture 52. A threaded aperture 53, which extends from the upper surface of the block 36 into the aperture 39 receives a stop pin 54 which projects into a cavity 55 formed by the horizontal flat 47 to limit the movement of the rod 46 within the aperture 39.

As shown in FIG. 9 the position of the block 36 within the groove 33 is adjusted by turning a knurled knob 56 which rotates a threaded rod 57 having a spherical enlargement 58 on one end thereof. The rod 57 is threadably mounted within an aperture 59 of a standard 61 mounted on the plate 32 by suitable fasteners 62 so as to move the spherical enlargement 58 longitudinally upon turning of the knob 56. A clamp 63 rigidly attached to the block 36 confines the spherical enlargement 58 for free rotation but only limited longitudinal movement. A similar arrangement for adjusting the position of the plate 32 on the base 27 is shown in FIG. 5 wherein a knurled knob 64 turns a threaded rod 66 within a threaded aperture 67 of an upright member 68. As the knob 64 is turned the plate 32 is longitudinally translated through its connection with a ball housing 69 to which an end of the threaded rod 66 is coupled. A plurality of detents 70 (FIG. 9) seat within suitably provided recesses in the plate 32 to lock the block 36 in relation to the surface 34 at any desired position. Similarly, a pair of detents 71 prevent further relative movement between the plate 32 and base 27. The detents shown may function as ordinary setscrews merely by turning the threaded portions of the detents downwardly.

An upright holder 72 (FIG. 6) mounted on the base 27 by a plurality of threaded members 73 is located in juxtaposition to the block 36. Secured to the upper surface of the holder 72 by threaded members 74 is a clamping bar 75 having a plurality of transverse grooves 76 formed therein. Directly opposite the grooves 76 is a set of matching parallel grooves 77 in the upper surface of the upright holder 72. Between each set of grooves 76 and 77 is slidably disposed a cylindrical rod 78 having a conical end portion 79 (FIG. 8). The rods 78 are secured within the grooves by drawing of the clamping bar 75 downwardly by the threaded members 74. Corresponding ends 81 of the cylindrical rods 78 are abutted by pressure pads 82 to which are engaged leaf springs 83 held in position by a fastener bar 84 which is rigidly attached to the upright holder 72.

Referring to FIGS. 6 and 7, a fixture 86 is mounted by members 87 on the base 27 in alignment with the upright holder 72 and the block 36. An annular bushing 88 is retained within an aperture 89 in the fixture 86 by lock rings 91 for reception therein of a journal portion of a shaft 92 provided with a reduced portion 93 and a threaded portion 94. Longitudinal motion of the shaft 92 within the aperture 89 is restricted by a flange 96 formed integrally with the shaft. A polygonal cam 97 is mounted on the reduced portion 93 of the shaft 92 by a nut 98. It will be noted that the cam 97 is congruous in cross section to a vertical cross section of the workpiece 16 across its rectangular portion 24. A rigid elongated bar 101 is operatively connected through a coupling 99 to the shaft 92 (FIG. 1). The bar 101 is turned by the workholder 13 upon each incremental rotation of the workpiece 16, and this rotation is imparted to the cam 97.

A pair of roller bearings 102 (FIG. 7), retained within an aperture 103 in the fixture 86 by lock rings 104, support a cylindrical rod 106. A compression spring 107 is concentrically mounted on the rod 106 by a cap 108 which is fastened to the rod by a threaded member 109. An upright bar 111 is attached to the end of the rod 106 opposite the cap 108 and is maintained in constant engagement with the cam 97 by the bias of the spring 107 compressed between the cap 108 and the fixture 86. A pair of retaining plates 112 are spaced from the upright bar 111 by washers 113 of resilient material and are held thereon by threaded members 114. A bifurcated block 117 is secured to the upper surface of the fixture 86 by threaded members 116, and the bifurcations of the block serve as a guide for an upper portion of the upright bar 111 slidably received therebetween.

One end of a flexible template 118 is secured to the upright bar 111 by the retaining plates 112, and the other end of the template is secured to the cylindrical rod 46 by means of the C-clamp 49. Although the template 118 is shown as consisting of two triangles joined at their apexes, it may be understood that various-shaped templates may be used to obtain different curves.

In the operation of the apparatus comprising the invention, the workpiece 16 is placed within the work holder 13 of a milling machine. Assuming that the workpiece 16 to be milled is rectangular in cross section, it is oriented with respect to the support 12 in the same relative position as the cam 97. Further, assuming the cam 97 is first in a vertical position and the small dimension thereof is equal to the diameter of the round portion 23 of the workpiece 16 to be milled, the flexible template 118 is unflexed (FIG. 10a) at the start of the milling operation.

As milling progresses, the workpiece 16 is rotated in predetermined increments by means of the gearing within housing 18 as the vernier dial 17 is indexed. Because the rigid bar 101 which rotates the cam 97 is connected to the workholder 13, any such rotation of the workpiece 16 causes a like rotation of the cam 97. This will result in a flexing of the template 118 due to the horizontal movement of the upright bar 111.

Upon each incremental rotation of the cam 97 and the workpiece 16, the clamping bar 75 is loosened to allow the leaf springs 83, through pressure pads 82, to move the conical end portions 79 of the cylindrical rods 78 into engagement with the flexible template 118. The clamping bar 75 is then re-clamped to prevent further distortion of the template. After such reclamping of the rods 78 the stylus 21 is moved over the flexible template 118 which causes the milling head 19 to trace out a similar curve on the surface of the workpiece. As indicated in FIGS. 10a through 10c, progressively sharper curves are generated as the long dimension of the cam 97 moves from a vertical to a horizontal position.

Obviously the above-described specific embodiment of the invention is merely illustrative and various modifications may be made without departing from the scope and spirit of the invention.

What is claimed is:

1. An apparatus for shaping a workpiece which comprises pattern-tracing means, forming means for producing a predetermined shape of the workpiece co-operatively coupled to the pattern-tracing means and controlled thereby, means for rotating the workpiece to expose different portions of the surface of the workpiece to the forming means, pattern-generating means engaged by the tracing means for causing the forming means to shape the workpiece to the design of the generated pattern, means for changing the pattern, and means for relating the rotation of the workpiece to the motion of the means for changing the pattern.

2. An apparatus for shaping a workpiece which comprises pattern-tracing means, forming means for producing a predetermined shape of the workpiece co-operatively coupled to the pattern-tracing means and controlled thereby, means for rotating the workpiece to expose different portions of the surface thereof to the forming means, pattern-generating means engaged by the tracing means for causing the forming means to shape the workpiece to the design of the generated pattern, movable means for changing the pattern, and linkage coupled between the work-rotating means and the means for changing the pattern for relating the motions thereof.

3. An apparatus for shaping a workpiece which comprises a pattern-tracing stylus, a cutting head for producing a predetermined shape of the workpiece co-operatively coupled to the pattern-tracing stylus and controlled thereby, a workholder for incrementally rotating the workpiece to expose different portions of the surface thereof to the cutting head, a flexible template engaged by the tracing stylus for causing the cutting head to shape the workpiece to the contour of the template, movable means for changing the contour of the template, and linkage between the workholder and means for changing the contour of the template for relating the motions thereof.

4. An apparatus for shaping a workpiece which comprises a pattern-tracing stylus, a cutting head for producing a predetermined shape of the workpiece co-operatively coupled to the pattern-tracing stylus and controlled thereby, a rotatable workholder for rotating the workpiece to expose different portions of the surface thereof to the cutting head, clamping means, a flexible template engaged by the clamping means, the tracing stylus engaging the template such that the contour of the template is reproduced in the workpiece by the cutting head, movable means for shifting the template-clamping means for changing the contour of the template, and linkage between the workholder and the movable means for relating the motions thereof.

5. An apparatus for shaping a workpiece which comprises a pattern-tracing stylus, a cutting head for producing a predetermined shape in the workpiece co-operatively coupled to the pattern-tracing stylus and controlled thereby, a rotatable workholder for rotating the workpiece to expose different portions of the surface thereof to the cutting head, a plurality of clamps, a flexible template engaged by the clamps, the tracing stylus engaging the template whereby the contour of the template is reproduced in the workpiece by the cutting head, a movable cam in engagement with at least one of the clamps for shifting such clamps relatively to change the contour of the template, and linkage coupled between the rotatable workholder and the movable cam for relating the motions thereof.

6. An apparatus for shaping a transition between polygonal and round sections of a workpiece which comprises a pattern-tracing stylus, a cutting head for shaping the transition in the workpiece, said cutting head being coupled operatively to the stylus and controlled thereby, a rotatable workholder for rotating the workpiece to expose different portions of the surface thereof to the cutting head, a pair of clamps, a flexible template engaged at each end by the clamps, the tracing stylus engaging the template whereby the contour of the template is reproduced in the workpiece by the cutting head, a rotary cam in engagement with one of the clamps for shifting it relative to the other clamp to change the contour of the template, a cam shaft for rotating the cam, and linkage coupled beween the rotatable workholder and the cam shaft for interlocking the rotation of one with the rotation of the other whereby the curve of the template is changed as the workpiece is rotated.

7. An apparatus for shaping a workpiece which comprises a pattern-tracing stylus, cutting head for producing a predetermined shape of the workpiece co-operatively coupled to the pattern-tracing stylus, an incrementally rotatable workholder for rotating the workpiece to expose different portions of the surface thereof to the cutting head, a plurality of clamps, a flexible template engaged by the clamps, the tracing stylus engaging the template whereby the contour of the template is reproduced in the workpiece by the cutting head, and a movable cam corresponding in shape to a portion of the cross section of the workpiece in engagement with at least one of the clamps for shifting such clamps relatively to flex the template into a predetermined contour.

8. In an apparatus for machining a transition section in a workpiece having an axis of rotation, said transition being between circular and polygonal sections of the workpiece, a cutter for engagement with said workpiece at a point, a work holder for incrementally rotating said workpiece to incrementally change the length of a line normal to the axis of rotation of said workpiece and passing through said point of engagement of the cutter with the workpiece on a polygonal section thereof, a movable stylus coupled to said cutter, a flexible template in engagement with said stylus, said template having one end fixed against motion in one direction, an incrementally movable cam operatively coupled to the opposite end of said template, said cam having one dimension which varies upon the incremental motion of the cam in an amount equal to the incremental variation of the length of said line, and means for simultaneously moving said cam and said workpiece in proportional increments.

References Cited in the file of this patent
UNITED STATES PATENTS

| | | |
|---|---|---|
| 1,410,591 | Norton | Mar. 28, 1922 |
| 1,956,505 | Horner | Apr. 24, 1934 |
| 1,973,507 | Ross | Sept. 11, 1934 |
| 2,359,704 | Woody | Oct. 3, 1944 |
| 2,686,993 | Mentley | Aug. 24, 1954 |
| 2,785,608 | Walti | Mar. 19, 1957 |
| 2,811,085 | Burke | Oct. 29, 1957 |

Disclaimer 3,094,898.—*Francis J. Fuchs, Jr.*, Winston-Salem, N.C. TEMPLATE FIXTURE.
Patent dated June 25, 1963. Disclaimer filed July 23, 1964, by the assignee, *Western Electric Company, Incorporated.*
Hereby enters this disclaimer to all the claims in said patent.
[*Official Gazette October 27, 1964.*]